(12) United States Patent
Campbell

(10) Patent No.: US 7,070,848 B2
(45) Date of Patent: Jul. 4, 2006

(54) VEHICLE ACOUSTIC BARRIER

(75) Inventor: Michael T. Campbell, Grand Rapids, MI (US)

(73) Assignee: Cascade Engineering, Inc., Grand Rapids, MI (US)

( * ) Notice: Subject to any disclaimer, the term of this patent is extended or adjusted under 35 U.S.C. 154(b) by 0 days.

(21) Appl. No.: 10/274,769

(22) Filed: Oct. 21, 2002

(65) Prior Publication Data

US 2004/0075290 A1 Apr. 22, 2004

(51) Int. Cl.
*B32B 3/10* (2006.01)
*E04B 1/82* (2006.01)
*E04B 2/02* (2006.01)
*E04B 1/84* (2006.01)

(52) U.S. Cl. ............... 428/137; 181/284; 181/286; 181/288; 181/290; 181/292; 181/293; 181/294

(58) Field of Classification Search ............... 428/137; 181/284, 286, 288, 290, 292–294
See application file for complete search history.

(56) References Cited

U.S. PATENT DOCUMENTS

| | | | | |
|---|---|---|---|---|
| 1,840,494 | A | 1/1932 | Eshbaugh | 248/27.1 |
| 2,223,395 | A | 12/1940 | Van Buren | 296/39.3 |
| 2,237,623 | A | 4/1941 | Ledwinka | 181/208 |
| 4,191,273 | A | 3/1980 | Williams | 180/89.13 |
| 4,211,305 | A * | 7/1980 | Matthews et al. | 181/248 |
| 4,288,490 | A * | 9/1981 | Alfter et al. | 428/314.8 |
| 4,330,046 | A * | 5/1982 | Lerner et al. | 181/210 |
| 4,455,338 | A | 6/1984 | Henne | |
| 4,584,232 | A * | 4/1986 | Frank et al. | 442/30 |
| 4,655,496 | A | 4/1987 | Gahlau et al. | 296/39.3 |
| 4,705,139 | A | 11/1987 | Gahlau et al. | 181/290 |
| 4,825,974 | A * | 5/1989 | Hoffmann et al. | 181/290 |
| 5,196,253 | A | 3/1993 | Mueller et al. | 428/138 |
| 5,234,246 | A | 8/1993 | Henigue et al. | 296/70 |
| 5,483,028 | A | 1/1996 | Holwerda | 181/207 |
| 5,557,078 | A | 9/1996 | Holwerda | 181/208 |
| 5,922,265 | A | 7/1999 | Parekh | 264/257 |
| 5,975,609 | A | 11/1999 | Campbell | 296/39.3 |
| 6,024,190 | A | 2/2000 | Ritzema | 181/286 |
| 6,089,349 | A | 7/2000 | Aye | 181/284 |
| 6,092,854 | A | 7/2000 | Campbell | 296/70 |
| 6,260,660 | B1 * | 7/2001 | Yoerkie et al. | 181/290 |
| 6,260,914 | B1 | 7/2001 | Nieminski et al. | 296/190.08 |
| 6,695,374 | B1 * | 2/2004 | Gebreselassie et al. | 180/90 |

* cited by examiner

*Primary Examiner*—Harold Pyon
*Assistant Examiner*—Patricia L. Nordmeyer
(74) *Attorney, Agent, or Firm*—Price, Heneveld, Cooper, DeWitt & Litton, LLP

(57) ABSTRACT

An acoustic barrier that achieves excellent noise insulating properties, and is relatively thin and relatively light in weight includes a flexible thermoplastic barrier layer having a plurality of apertures defining a latticed structure which includes apertures for pass-through components and non-pass-through apertures. The non-pass-through apertures are located where noise levels are expected or known to be relatively low. Effective acoustic performance can be maintained by completely eliminating material from the relatively thick and dense barrier layer at the low noise levels areas, and providing only absorptive decoupler material and/or lightweight sheet material such as plastic films in those areas.

18 Claims, 3 Drawing Sheets

VEHICLE ACOUSTIC BARRIER

FIELD OF THE INVENTION

This invention relates to acoustic barriers for motor vehicles, and more particularly to acoustic barriers that reduce the amount of noise from the engine compartment of a motor vehicle which enters into the passenger compartment of the vehicle.

BACKGROUND OF THE INVENTION

It has become common practice in the automotive industry to position an acoustic barrier adjacent a steel body panel separating the engine compartment of a vehicle from a passenger compartment to reduce the level of noise entering the passenger compartment from the engine compartment. Typical vehicle acoustic barriers comprise a noise-insulating panel made of self-supporting, thermoset materials such as reaction injection molded polyurethanes, and thermoplastic materials, such as highly filled ethylene vinyl acetate copolymer, polyvinyl chloride and polypropylene, which is usually positioned on the passenger compartment side of the steel wall separating the engine compartment from the passenger compartment. The noise insulating panel is typically spaced from the steel wall, and the space between the noise insulating panel and the steel wall may be filled with loosely structured materials, such as foams, fibers, flakes or the like, to improve high frequency absorption of noise. In some cases, a fibrous mat or foam panel is fixed to the thermoplastic noise insulating panel to provide a sound insulating system that can be installed as a unitary assembly.

Known automotive acoustic barriers are comprised of substantially continuous sheets or panels having openings only where absolutely necessary to allow passage of the steering column and other vehicle controls and systems that must pass from the engine compartment to the passenger compartment. These various component pass-through areas provide more significant sources of noise than areas of unbroken steel wall and noise insulating panel.

A known alternative acoustic treatment is to use absorbing material placed against the steel wall, although this construction will allow for absorption in the passenger compartment, the overall noise level without the barrier layer is usually higher.

In order to achieve improved vehicle fuel economy, it is desirable to achieve excellent noise insulating properties with a lighter weight acoustic barrier which can be easily installed on the engine compartment side or on the passenger compartment side of a steel wall separating the engine compartment from the passenger compartment.

SUMMARY OF THE INVENTION

The invention provides an improved motor vehicle acoustic barrier that achieves excellent noise insulating properties, and is relatively light in weight. The acoustic barrier of this invention can be manufactured at a relatively low cost and can be easily installed either on the engine compartment side or on the passenger compartment side of a steel wall separating the engine compartment from the passenger compartment of a motor vehicle.

The advantages of this invention may be achieved by using a barrier construction in high noise areas such as around the opening for the steering column or other vehicle control pass-throughs while eliminating the barrier material in the less noisy areas. This can be accomplished through utilization of an acoustic barrier layer having a plurality of apertures defining a latticed structure. In addition to apertures for a steering column and other pass-through vehicle controls and systems, there are provided a plurality of apertures in areas where there are not any pass-through components and where noise levels are expected or known to be relatively low.

In another aspect of the invention, separate local barriers designed to fit around high noise areas, such as a steering column opening, are used in combination with a sound absorbing layer of material, such as a plastic foam or a fibrous mat or other commonly used decoupler material, as a substrate to hold the local barriers in place.

These and other features, advantages and objects of the present invention will be further understood and appreciated by those skilled in the art by reference to the following specification, claims and appended drawings.

DESCRIPTION OF THE PREFERRED EMBODIMENTS

It has been discovered that the various pass-through components and the sealing area around the pass-through components are sources of significantly higher noise than the areas of unbroken steel and dash insulator where no controls or systems pass from the engine compartment to the passenger compartment. Further, it has been determined that the weight of an acoustic barrier may be reduced while maintaining an effective acoustic performance by eliminating areas of the barrier located away from the pass-through components. More generally, it has been discovered that reduced weight may be achieved without sacrificing acoustic performance and without increasing the thickness of the barrier by providing the acoustic barrier with openings where noise levels are expected or known to be relatively low. Conventional acoustic testing equipment and methods may be utilized to determine those areas of the acoustic barrier where openings may be provided without significant detriment to acoustic performance.

Figure 1:
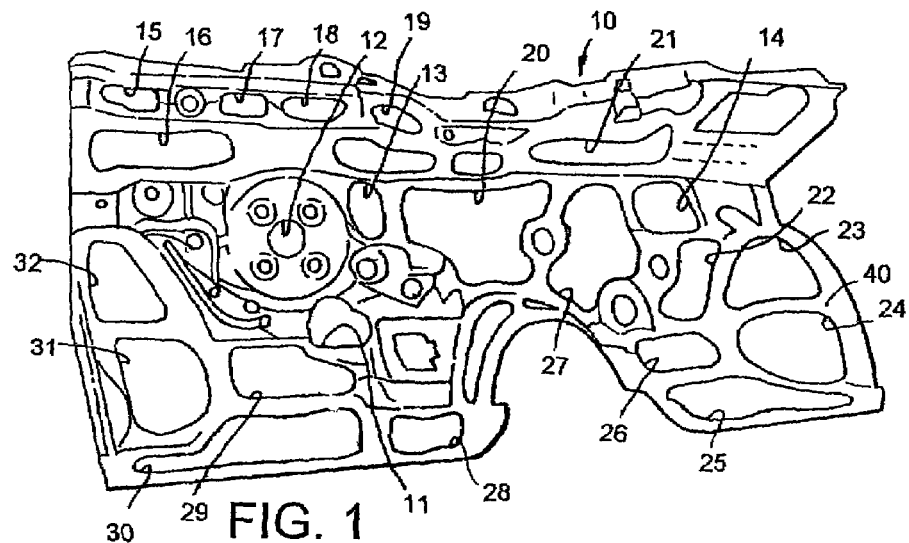
FIG. 1 is a perspective view of an acoustic barrier in accordance with an embodiment of this invention where a lattice or web is used to make the barrier component.

Shown in FIG. 1 is an acoustic panel or barrier layer 10 having a circular pass-through aperture 12 for a steering column, and various other apertures 11, 12 and 14 to allow controls and/or other systems to pass from the engine compartment to the passenger compartment through a steel wall and the acoustic barrier. The acoustic barrier is generally located immediately adjacent the steel wall. Unlike the relatively dense mass layer or barrier layers of conventional vehicle acoustic barriers, acoustic panel 10 in accordance with an aspect of the invention includes a plurality of apertures that are not utilized for pass-through controls or components. For example, apertures 15–32 are not required to permit passage of components from the engine compartment to the passenger compartment, but instead are located at areas where noise levels are expected to be relatively low, or are known to be relatively low, whereby the weight of the acoustic panel is significantly reduced. The plurality of apertures (e.g., 15–32) define a latticed structure or web 40.

Acoustic panel 10 is typically made of a relatively dense plastic or elastomeric material such as rubber modified polypropylene, elastomer-modified polyamides, elastomeric polyurethanes, thermoset polyurethanes or another filled polymer material, and serves as a sound barrier to reduce the transmission of sound from the engine compartment through a steel wall separating the engine compartment from the passenger compartment of a vehicle.

Figure 2:
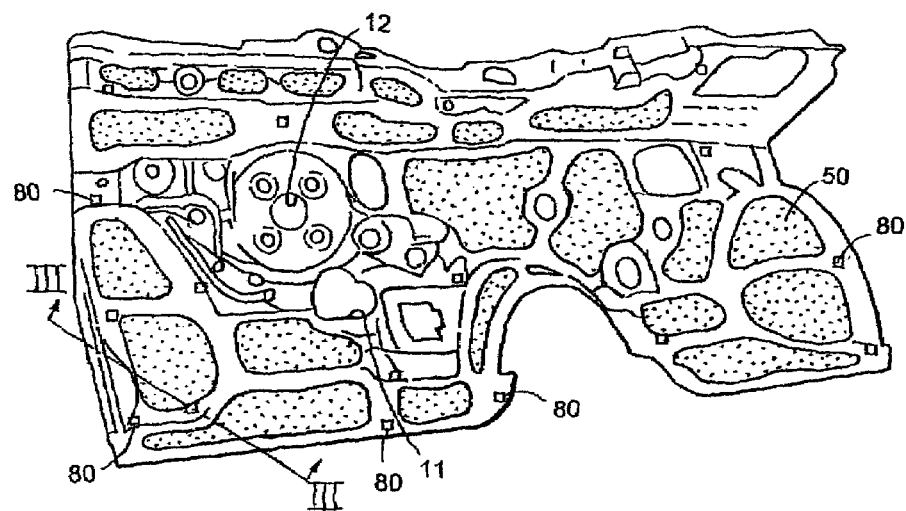
FIG. 2 is a perspective view of an acoustic barrier assembly in accordance with this invention comprising the acoustic barrier shown in FIG. 1 fixed to a sound absorbing decoupler layer.

As shown in FIG. 2, a sound absorptive decoupler mat or layer 50 may be attached to acoustic barrier layer 10 to further reduce the transmission of sound from the engine compartment through a wall separating the engine compartment from the passenger compartment. More specifically, absorptive decoupler layer 50 serves to separate the acoustic barrier layer from the steel wall 60 (FIG. 3) separating the engine compartment from the passenger compartment, and acoustically decouple the barrier layer 10 from the barrier wall to minimize the direct transfer of sound vibrations through the barrier layer 10. Sound absorptive decoupler layer 50 may be formed of a flexible foam material, such as polyurethane, or a fibrous batt such as fiberglass batting, shoddy cotton or other relatively low density insulating materials that are commonly employed as sound decoupling layers in acoustic barrier assemblies.

Alternatively, or optionally, a polymer film 70 may be attached to web 40 to provide adequate acoustic barrier properties at the openings (e.g., 15–32) formed in web 40. Examples of suitable films include polyolefin films such as polyethylene films, polyethylene terephthalate films, polypropylene films, and the like. Film 70 covers the non-pass-through openings of web 40, but has a pattern of openings which corresponds with the pass-through openings in web 40. Film 70 may be used to provide an ultra-lightweight barrier that enhances and/or supplements sound blocking characteristics. Additionally, film 70 may be utilized to tune the sound absorptive characteristics of the decoupler layer 50, i.e., enhance absorption of low frequency sounds.

Figure 3:
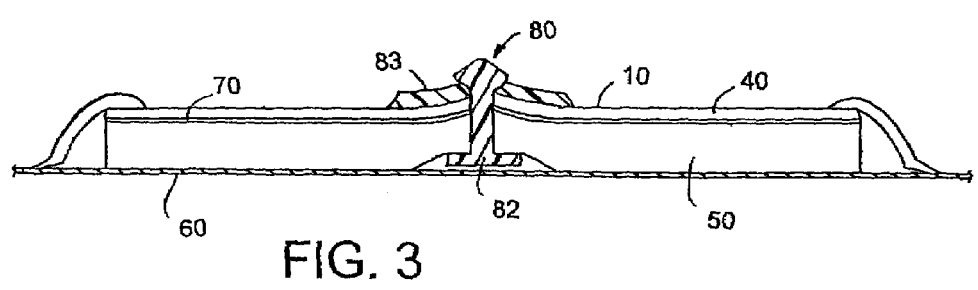
FIG. 3 is a sectional view of the acoustic barrier assembly as seen along view lines III—III of FIG. 2.

As shown in FIG. 3, absorptive decoupler layer 50 and optional polymer film layer 70 may be secured to web 40 using a plurality of mechanical fasteners 80. Fasteners 80 include a stud member 82 which is pressed fit into a retainer ring 83. Other types of fasteners and/or adhesives may be employed. However, mechanical fastener are preferred over adhesives because they do not utilize volatile organic solvents or other potentially hazardous chemicals. As another alternative, a foam (e.g., polyurethane foam) may be cast directly on or against web 40 to achieve an integral assembly wherein mechanical fasteners and/or adhesive are not needed due to adhesive bonding established with the web 40 or film layer 70 during solidification of the foam.

An important feature or characteristic of the invention is the use of an acoustic barrier having a plurality of non-pass-through areas where the elimination or reduction of the barrier occurs while maintaining barrier treatment in critical areas of pass-throughs or structural need.

It has been discovered that reduced weight of the acoustic barrier may be achieved while maintaining an effective acoustic performance by completely eliminating material from the relatively thick and dense barrier layer 10 in those areas where noise levels are relatively low, and providing only absorptive decoupler material and/or lightweight barrier sheet materials such as plastic film in those areas.

An important feature or characteristic of one embodiment of the invention is the use of an acoustic barrier having a plurality of non-pass-through openings which define a latticed structure or web onto which may optionally be attached a polymer film, a sound absorptive decoupler mat, or both a polymer film and a sound decoupler mat which cover the non-pass-through openings, but which do not cover the pass-through openings, such as openings 11–14.

The acoustic barrier assemblies of this invention may be prepared by eliminating material (i.e., cutting openings) in areas of the acoustic barrier layer 10 where noise levels are low, and attaching foam, fiber bat, or other suitable sound absorptive decoupler materials to the resulting latticed structure or web 40, and/or attaching a continuous sheet of a lightweight barrier material 70, such as a polymer film. Other lightweight barrier sheet materials which may be attached to web 40 include lightweight fabrics such as scrim, paper, and the like. When both a sound absorbing decoupling layer and a lightweight barrier material are used, the lightweight barrier sheet material 70 is preferably disposed between sound absorptive decoupling layer 50 and the web 40. Alternatively, the barrier 10 may be formed or molded with the openings (e.g., 12–32) predefined by the molding tool.

Figure 5:
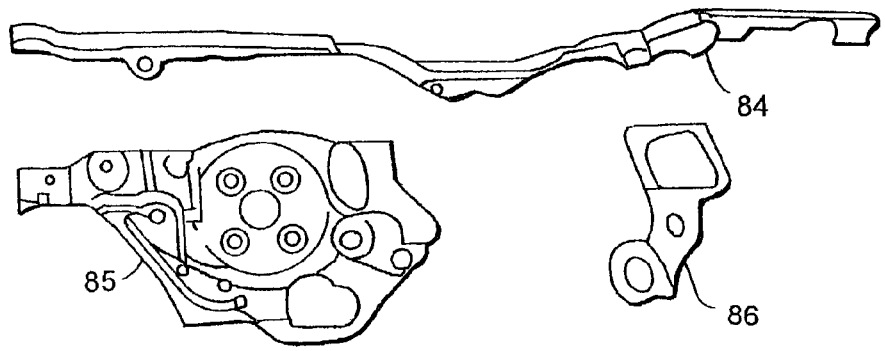
FIG. 5 is a perspective view of an acoustic barrier in accordance with an embodiment of this invention where local barriers are used for acoustic treatment of high noise areas.
Figure 6:
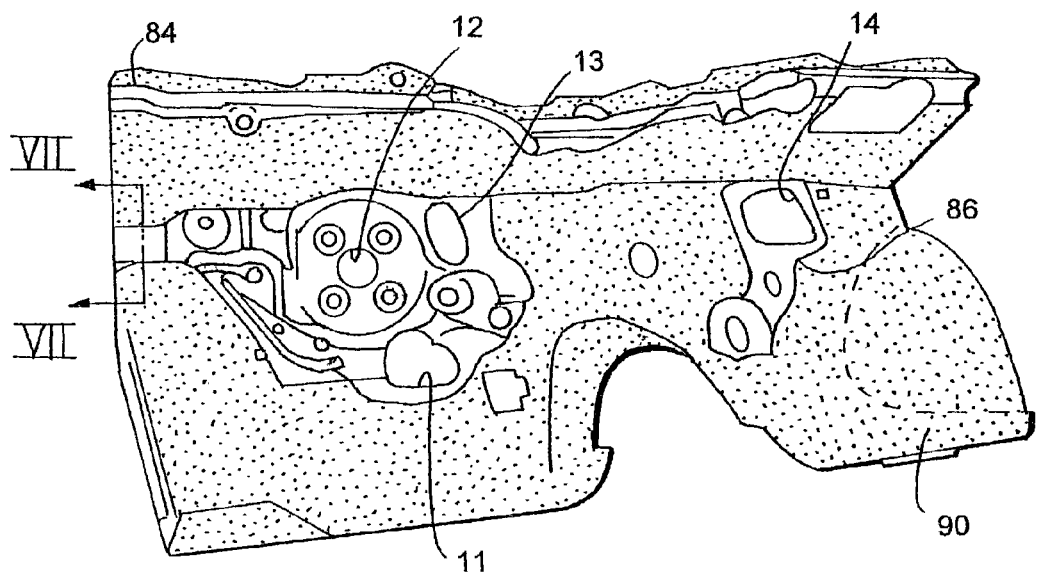
FIG. 6 is perspective view of an acoustic barrier assembly in accordance with this invention where the local barriers used for acoustic treatment of high noise areas are attached to an absorber.
Figure 7:
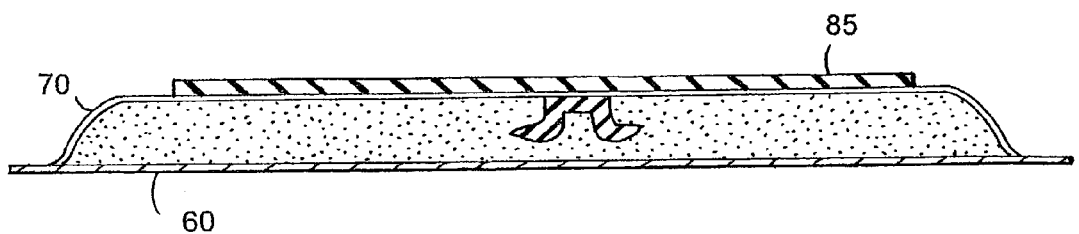
FIG. 7 is a sectional view of the acoustic barrier assembly as seen along view lines VII—VII of FIG. 6.

An embodiment shown in FIGS. 5–7 may be useful in vehicles wherein a wall separating the engine compartment from the passenger compartment has fewer areas where a barrier will improve the acoustic attenuation. In this embodiment, individual local barrier pieces 85 and 86 are separately attached to a substrate sheet such as a sound absorptive decoupler mat 90. As with the embodiments of FIGS. 1–3, the embodiment of FIGS. 5–7 may include a lightweight barrier 70, such as a polymer film to enhance acoustic properties. In addition to its primary function of sound absorption, decoupler mat 90 separates the acoustic barrier pieces 85, 86 from steel wall 60 to minimize transfer of sound vibrations through the barrier pieces 85, 86. Individual structural pieces, such as 84, may also be attached to provide support and shape to the assembly.

Barrier pieces 85 and 86 overlap with only a relatively small or minor portion of the area of the substrate (decoupler mat and/or lightweight barrier), i.e., a majority of the surface area of the substrate is not covered by the barrier pieces.

Barrier layers 10, 85 and 86 are generally from about 1 to 5 millimeters thick, but may be thinner or thicker if desired, whereas lightweight sheet material 70 is typically much thinner, e.g., from about 20 µm to 200 µm thick.

When the need for reduced weight of the acoustic barrier is greater, smaller barrier pieces 85, 86 can be used in those areas where noise levels are relatively high, or where structural support 84 is needed for assembly to the vehicle.

Other lightweight barrier sheet materials 70 include lightweight fabrics such as scrim, paper, thin polyolefin foams and the like. When both a sound absorbing decoupling layer and a lightweight barrier material are used, the lightweight barrier sheet material 70 is typically disposed between sound absorptive decoupling layer 87 and the barrier 85.

As with the embodiment of FIGS. 1–3, the barrier pieces 85, 86 may be secured to a substrate using mechanical fasteners, adhesives, heat staking, fusion welding, or the like, or a combination of these. Alternatively, a substrate (e.g., polyurethane) may be formed (e.g., cast, compression molded, vacuum formed, etc.) directly on or against barrier pieces 85, 86, whereby adhesion between the barrier pieces and the substrate and/or physical entrapment of the barrier pieces is established during the forming process.

The acoustic barrier assemblies of this invention may be installed on either the engine compartment side or on the passenger compartment side of a steel wall 60 physically separating the engine compartment from the passenger compartment.

Figure 4:
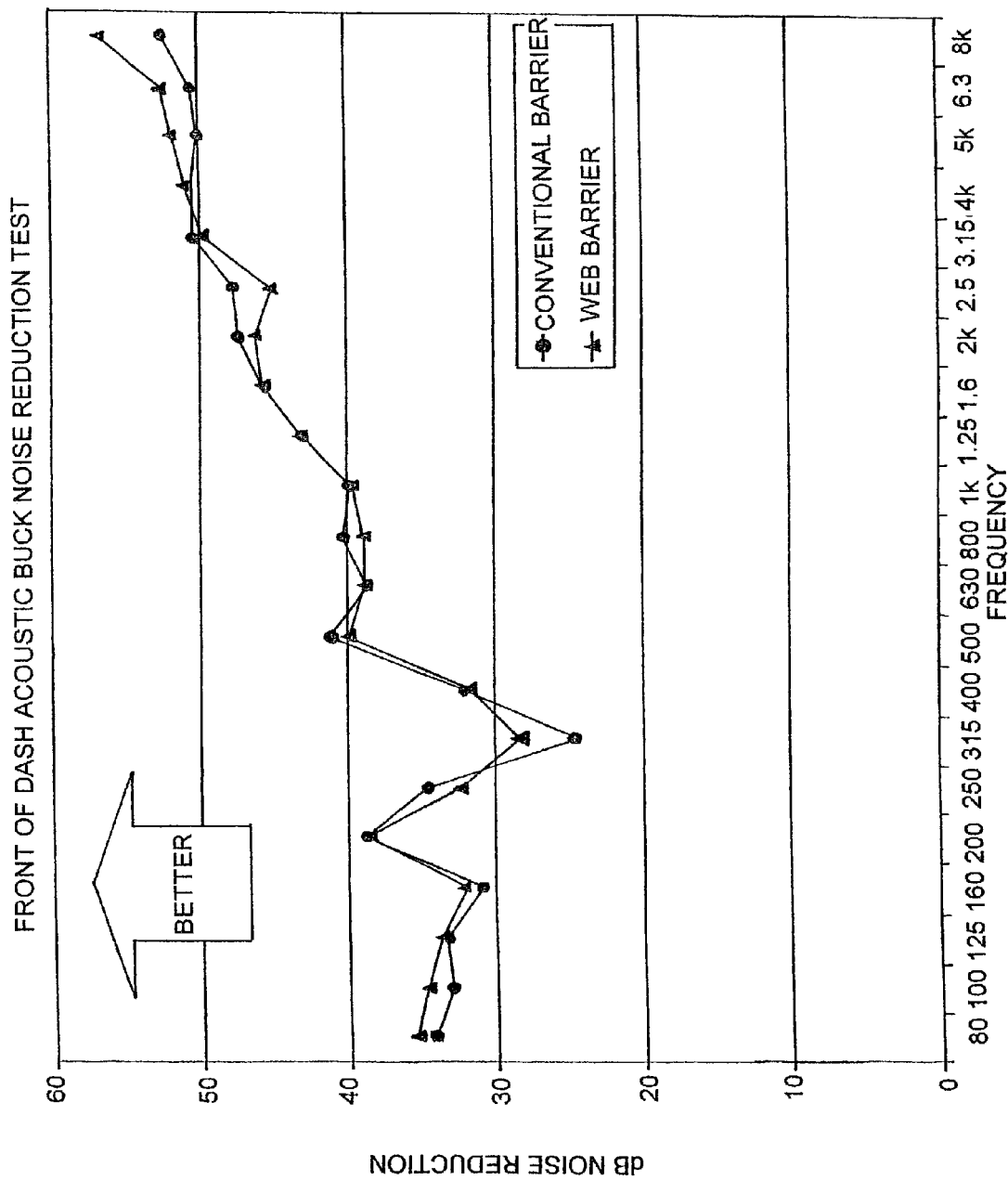
FIG. 4 is a graph of noise reduction as a function of frequency for a conventional acoustic barrier and for an acoustic barrier in accordance with this invention.

Shown in FIG. 4 is a graph comparing the performance of a conventional barrier with a web barrier in accordance with this invention. The graph is a measure of the noise blocked by the front of a vehicle dash. Noise reduction is measured without the instrument panel installed, but with all components that attach to the front of the dash and through the acoustic barrier assembly. The higher the measurement, the less noise that is passing through the passenger compartment at each frequency band. The performance of the web barrier is very similar to the performance of a conventional barrier. However, the weight of the tested conventional barrier was 13.5 pounds, while the tested web barrier assembly of the invention weighed less than 9 pounds. This is about a 30% reduction in weight, which is achieved by removing at least about 30% of the material from the thermoplastic barrier layer 10, i.e., the total area of the apertures in the thermoplastic barrier 10 desirably represents at least about 25% of the area of the barrier layer 10, more preferably at least 30% or 40% of the area of the barrier layer 10.

The above description is considered that of the preferred embodiments only. Modifications of the invention will occur to those skilled in the art and to those who make or use the invention. Therefore, it is understood that the embodiments shown in the drawings and described above are merely for illustrative purposes and not intended to limit the scope of the invention, which is defined by the following claims as interpreted according to the principles of patent law, including the doctrine of equivalents.

The invention claimed is:

1. An acoustic treatment assembly comprising at least one acoustic barrier piece attached to a sound absorptive decoupler layer comprised of flexible foam material or fibrous material, the acoustic barrier piece or pieces overlapping less than a majority of the surface area of one side of the sound absorptive decoupler layer.

2. The acoustic treatment assembly of claim 1, wherein the sound absorptive decoupler layer is comprised of a flexible polyurethane foam.

3. The acoustic treatment assembly of claim 2, wherein the acoustic barrier piece is secured to the sound absorptive decoupler layer with mechanical fasteners.

4. The acoustic treatment assembly of claim 1, wherein the acoustic barrier piece is secured to the sound absorptive decoupler layer by forming the sound absorptive decoupler layer directly on or against the acoustic barrier piece to establish adhesion between the acoustic barrier piece and the sound absorptive decoupler layer and/or physically entrap the acoustic barrier piece with the sound absorptive decoupler layer during forming of the sound absorptive decoupler layer.

5. The acoustic treatment assembly of claim 2, further comprising a lightweight barrier sheet material disposed between the sound absorptive decoupler layer and the acoustic barrier piece.

6. The acoustic treatment assembly of claim 1, wherein the sound absorptive decoupler layer is a fibrous mat comprising a material selected from the group consisting of fiberglass batting and shoddy cotton.

7. An acoustic treatment assembly for reducing the transmission of sound through a metal wall separating an engine compartment from a passenger compartment of a motor vehicle, comprising:
a barrier panel having a plurality of apertures defining a latticed structure; and
a sound absorptive decoupler layer comprised of flexible foam material or fibrous material joined to the latticed structure, the sound absorptive decoupler layer covering certain apertures in the barrier panel, and having a pattern of openings which corresponds with other apertures in the barrier panel, whereby controls and/or other systems are allowed to pass from the engine compartment to the passenger compartment.

8. The acoustic treatment assembly of claim 7, further comprising a polymer film disposed between the latticed structure and the sound absorptive decoupler layer.

9. The acoustic treatment assembly of claim 8, wherein the polymer film layer and the sound absorptive decoupler layer are secured to the latticed structure with mechanical fasteners.

10. The acoustic treatment assembly of claim 7, wherein the total area of the apertures is at least 25% of the area of the barrier panel.

11. The acoustic treatment assembly of claim 7, wherein the sound absorptive decoupler layer is a flexible polyurethane foam.

12. The acoustic treatment assembly of claim 7, wherein the sound absorptive decoupler layer is a fibrous batt comprising a material selected from the group consisting of fiberglass batting and shoddy cotton.

13. The acoustic treatment assembly of claim 7, wherein the barrier panel is secured to the substrate sheet by forming the substrate sheet directly on or against the barrier panel to establish adhesion between the substrate sheet and the barrier panel and/or physical entrapment of the barrier panel by the substrate sheet during forming of the substrate sheet.

14. An acoustic treatment assembly for reducing the transmission of sound through a metal separating an engine compartment from a passenger compartment of a motor vehicle, comprising:
a barrier panel comprised of a filled polymer material and having a plurality of apertures defining a latticed structure; and
a sound absorptive decoupler layer comprised of flexible foam material or fibrous material joined to the latticed structure, the sound absorptive decoupler layer covering certain apertures in the barrier panel, and having a pattern of openings which corresponds with other apertures in the barrier panel, whereby controls and/or other systems are allowed to pass from the engine compartment to the passenger compartment.

15. The acoustic treatment assembly of claim 14, wherein the filled polymer material comprises a plastic or elastomeric polymer.

16. The acoustic treatment assembly of claim 15, wherein the plastic or elastomeric polymer is selected from the group consisting of rubber modified polypropylene, elastomer-modified polyamides, elastomeric polyurethanes, and thermoset polyurethanes.

17. The acoustic treatment assembly of claim 14, wherein the sound absorptive decoupler layer is comprised of flexible polyurethane foam.

18. The acoustic treatment assembly of claim 14, wherein the sound absorptive decoupler layer is comprised of a material selected from group consisting of fiberglass batting and shoddy cotton.

* * * * *